(12) United States Patent
Shereyk et al.

(10) Patent No.: US 8,360,104 B2
(45) Date of Patent: Jan. 29, 2013

(54) PRESSURE RELIEF ASSEMBLY

(75) Inventors: David A. Shereyk, Homewood, IL (US); Brian R. Peek, Mokena, IL (US)

(73) Assignee: Illinois Tool Works Inc., Glenview, IL (US)

( * ) Notice: Subject to any disclaimer, the term of this patent is extended or adjusted under 35 U.S.C. 154(b) by 342 days.

(21) Appl. No.: 12/740,713

(22) PCT Filed: Nov. 20, 2008

(86) PCT No.: PCT/US2008/084160
§ 371 (c)(1),
(2), (4) Date: Apr. 30, 2010

(87) PCT Pub. No.: WO2009/070487
PCT Pub. Date: Apr. 6, 2009

(65) Prior Publication Data
US 2010/0243083 A1 Sep. 30, 2010

Related U.S. Application Data

(60) Provisional application No. 60/990,681, filed on Nov. 28, 2007.

(51) Int. Cl.
*B60H 1/24* (2006.01)
*F16K 15/14* (2006.01)
(52) U.S. Cl. .................. 137/852; 454/162
(58) Field of Classification Search .......... 137/852, 137/855, 856; 454/162
See application file for complete search history.

(56) References Cited

U.S. PATENT DOCUMENTS

| | | | | |
|---|---|---|---|---|
| 1,161,693 A | * | 11/1915 | La Bounty | 137/855 |
| 2,781,054 A | * | 2/1957 | Neumann | 137/527.8 |
| 3,628,565 A | * | 12/1971 | McWethy et al. | 137/855 |
| 4,009,366 A | * | 2/1977 | Danell | 137/856 |
| 4,082,295 A | * | 4/1978 | Bainard | 137/856 |
| 4,179,051 A | * | 12/1979 | Thomas | 137/855 |
| 4,444,219 A | * | 4/1984 | Hollenstein | 137/856 |
| 4,781,106 A | * | 11/1988 | Frien | 454/164 |
| 5,105,849 A | * | 4/1992 | Clough | 137/512.15 |
| 5,194,038 A | * | 3/1993 | Klomhaus et al. | 454/162 |
| 5,247,912 A | * | 9/1993 | Boyesen et al. | 137/855 |
| 5,355,910 A | * | 10/1994 | Gies et al. | 454/162 |
| 5,373,867 A | * | 12/1994 | Boyesen et al. | 137/855 |
| 5,419,739 A | * | 5/1995 | Lewis | 454/162 |
| 5,492,505 A | * | 2/1996 | Bell et al. | 454/162 |
| 5,503,178 A | * | 4/1996 | Miskelley et al. | 137/855 |
| 5,727,999 A | | 3/1998 | Lewis | |
| 6,026,852 A | * | 2/2000 | Barton et al. | 137/512.15 |
| 6,210,266 B1 | | 4/2001 | Barton | |

(Continued)

FOREIGN PATENT DOCUMENTS

DE 202007013042 U1 11/2007
EP 0915302 A2 5/1999

OTHER PUBLICATIONS

ISR for PCT/US2008/084160 dated Feb. 19, 2009.

*Primary Examiner* — John Rivell
(74) *Attorney, Agent, or Firm* — Mark W. Croll; Paul F. Donovan (57) ABSTRACT

Embodiments of the present invention provide a pressure relief assembly that may include a main housing having an air passage chamber, and a flapper positioned on or within the air passage chamber. The flapper includes a membrane flap and a stabilizing member extending toward a center of the membrane flap. The stabilizing member prevents the center of said membrane flap from flapping open, but allows outer free edges of the membrane flap to open when air flow at a particular pressure is exerted into said membrane flap from an opening direction.

30 Claims, 9 Drawing Sheets

U.S. PATENT DOCUMENTS

| | | |
|---|---|---|
| 6,357,473 B1 | 3/2002 | Porter et al. |
| 6,609,535 B2 * | 8/2003 | Oppermann et al. ......... 137/855 |
| 7,503,843 B1 * | 3/2009 | Wilmoth ....................... 454/162 |
| 2004/0127154 A1 | 7/2004 | Omiya et al. |

* cited by examiner

PRESSURE RELIEF ASSEMBLY

RELATED APPLICATIONS

This application is a national phase of International Application No. PCT/US2008/084160, filed Nov. 20, 2008, and claims priority benefits from U.S. Provisional Patent Application No. 60/990,681 filed Nov. 28, 2007, which are hereby incorporated by reference in their entirety.

FIELD OF THE INVENTION

Embodiments of the present invention generally relate to a venting or pressure relief device configured for use in an enclosed area, such as an automobile, and more particularly to a pressure relief device that protects against debris and moisture infiltration.

BACKGROUND OF THE INVENTION

Interior cabins of vehicles typically include cabin vents or pressure relief devices. Without such devices, air pressure inside the vehicle cabin could damage occupants' ear drums. Further, when a vehicle door is closed, air pressure within the vehicle needs to be relieved or the door will not close. If an air bag is activated in a vehicle that does not have a venting or pressure relief device, an occupant's ear drums may be damaged.

Pressure relief devices are usually hidden from view. For example, a pressure relief device may be found in a trunk or on a body frame pillar structure. Each pressure relief device is adapted to allow air to pass out of an enclosed structure, while also preventing a significant amount of air, dust, water or other contaminants into the enclosed area. Thus, pressure relief devices are, in essence, one-way valves or one-way check valves, and are configured to maintain a small amount of back pressure per customer specifications.

Figures 1, 2, 3:
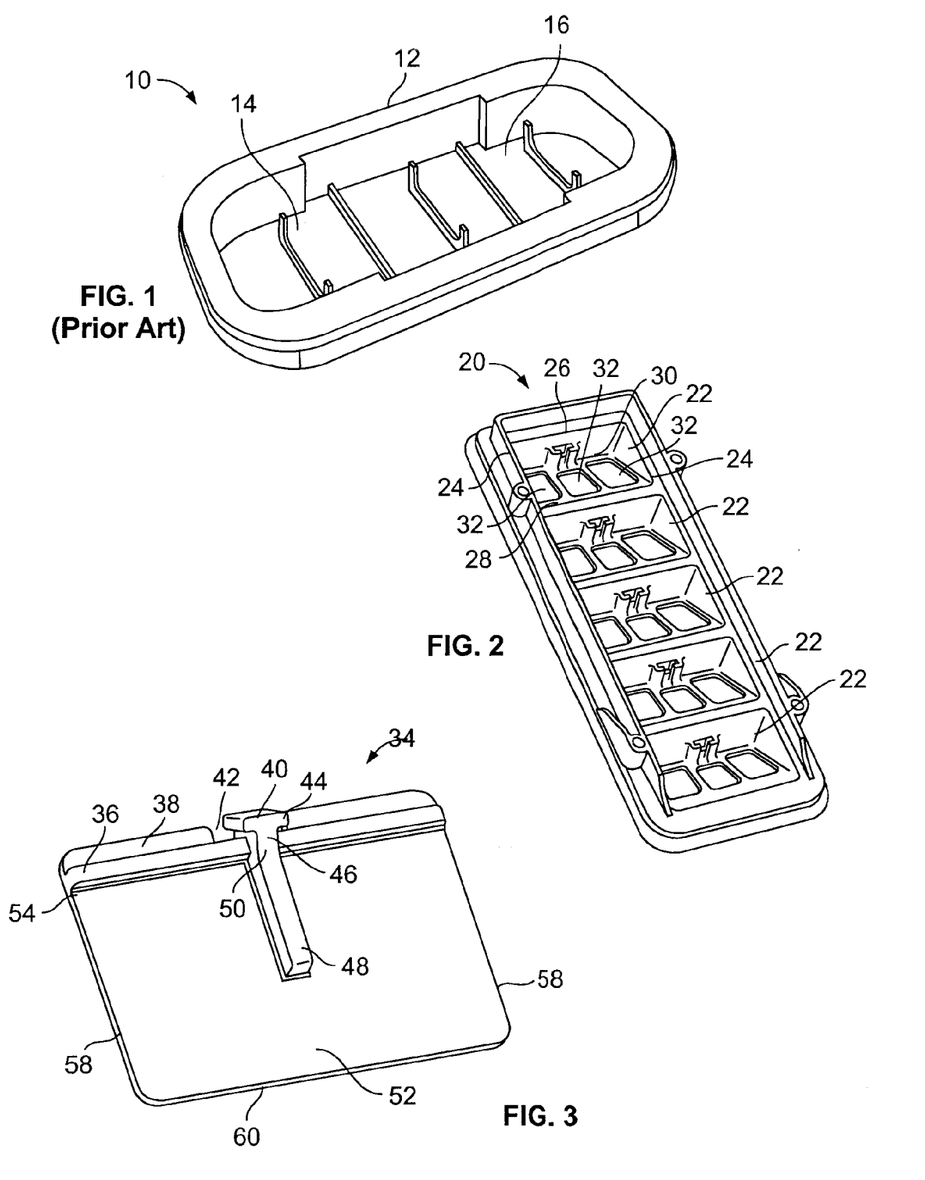
FIG. 1 illustrates an isometric view of a conventional pressure relief device.
FIG. 2 illustrates an isometric front view of a pressure relief housing, according to an embodiment of the present invention.
FIG. 3 illustrates an isometric front view of a flapper, according to an embodiment of the present invention.

FIG. 1 illustrates an isometric view of a conventional pressure relief device 10. The pressure relief device 10 includes a plastic main body 12 having a plurality of air passages 14. A light membrane 16 is positioned over the air passages 14, and is configured to allow air to pass in one direction. In order to allow air to pass, the light membrane 16 opens off of the main body 12 in response to air flow. Typically, a seal (not shown) is provided around the main body 12 and acts to seal the hole in the mating structure (not shown) upon assembly. The seal is typically molded around the main body 12 in a secondary molding operation, or may be adhesively or chemically attached to the main body 12.

During installation, the pressure relief device 10 may be snap fit to a structure. Typically, a user presses on the four corners of the pressure relief device 10 in order to secure it within a reciprocal hole in a structure.

If liquid contacts or accumulates on the pressure relief device 10, the liquid passes to a drain hole or channel. Gravity and the vertical orientation of the pressure relief device 10 assist in draining or channeling the liquid from the pressure relief device 10.

In large vehicles, such as semi-trucks, conventional pressure relief devices are known to allow the intrusion of water or other liquids into the enclosed area due to the size of the device, and the amount of water present. For example, during a high pressure cleaning process, a substantial amount of water may accumulate on, and infiltrate past, the pressure relief device.

Moreover, if the membrane 16 or other such member flaps as air passes through the device 10, a noticeable flapping noise may be audible to an occupant of the vehicle. Some conventional pressure relief devices include sanoprene membranes, which, while providing an effective seal, are susceptible to producing an undesirable flapping noise. Also, the sanoprene membrane includes die cut tabs that are adapted to mate with slots provided in the housing. This arrangement has been known to leak. Further, the assembly process is cumbersome.

Other conventional pressure relief devices include foam-like membranes to minimize flapping noise. These devices include die cut holes adapted to fit over tabs provided in the housing. However, the foam membranes often tear or rip near the small die cut holes.

Still other conventional pressure relief devices include mechanical lock arms in the housing that are configured to mechanically capture the edge of the membrane. Typically, the edge of membrane includes holes or slots that fit over a mating member on the housing in order to assist in the assembly process. Once positioned, the lock arm is closed shut. Again, however, these devices are known to produce flapping noise and the assembly process is often cumbersome.

Other conventional pressure relief devices include a flap overmolded directly in the housing. While the assembly process may be less cumbersome than other designs, these devices still produce undesirable flapping noise.

Some conventional pressure relief devices include a deposit of plastic or rubber-like material near the flapper/housing interface to increase the robustness of the flapper, thereby minimizing flapping motion. However, the outer edge of the flapper or membrane may not seat firmly against the housing edge, which compromises the seal and can still produce an audible flapping noise.

SUMMARY OF THE INVENTION

Certain embodiments of the present invention provide a pressure relief assembly including a main housing having an air passage chamber, and a flapper positioned within the air passage chamber. The flapper includes a membrane flap and a stabilizing member extending toward a center of the membrane flap. Optionally, the stabilizing member may be located at a position in which it extends from a portion of the membrane flap other than the center. The stabilizing member prevents the center of the membrane flap from flapping open, but allows outer free edges of the membrane flap to open when air flow at a particular pressure is exerted into the membrane flap from an opening direction. Outer free edges of the membrane flap may open to form a parabolic shape when air that exceeds a particular pressure is exerted into the membrane flap from the opening direction.

The degree of movement of the outer edges of the membrane flap increases the farther away from the stabilizing member. For example, a corner edge of the membrane flap is able to move more than an outer edge portion of the membrane flap positioned along a central axis that is aligned with the stabilizing member.

The flapper may include a base connected to the stabilizing member. The stabilizing member may include a straight beam perpendicularly extending from the base. Optionally, the stabilizing member may include a triangular main body having at least two curved sides.

The air passage chamber may be defined by a plurality of walls, such as lateral, top and bottom walls with an air passage wall extending therebetween. The air passage wall angles or inclines from a lower portion of one wall to an upper portion of another wall.

The main housing may include a stud retainer having a stud retaining slot. The flapper may include a connecting stud, wherein the stud is retained within the stud retaining slot.

The stud may include a pivot rod that is pivotally secured within the stud retainer. The pivot rod may be configured to pivot in the stud retainer, thereby causing the stabilizing member to pivot in response thereto. The stud may also include at least one stop member configured to limit a range of pivotal motion.

The stud may be angled with respect to said stabilizing member. For example, the angle between the stud and the stabilizing member may be acute.

The stud retainer may include a protuberance that exerts a force into the stud within the stud retainer slot. Optionally, the stud retainer may include a hole formed therethrough, with the stud being configured to latchably and sealably secure within the hole.

The membrane flap may include a plurality of strengthening ribs and/or areas of varying thickness.

The pressure relief assembly may include a flap seal formed of an elastomeric material secured to the main housing and sealingly engaging outer edges of the membrane flap when the membrane flap is in a closed position. The assembly may also include an outer seal secured around an outer perimeter of the main housing. The outer seal may be integrally connected to the flap seal.

Before the embodiments of the invention are explained in detail, it is to be understood that the invention is not limited in its application to the details of construction and the arrangement of the components set forth in the following description or illustrated in the drawings. The invention is capable of other embodiments and of being practiced or being carried out in various ways. Also, it is to be understood that the phraseology and terminology used herein are for the purpose of description and should not be regarded as limiting. The use of "including" and "comprising" and variations thereof is meant to encompass the items listed thereafter and equivalents thereof as well as additional items and equivalents thereof.

DETAILED DESCRIPTION OF THE INVENTION

FIG. 2 illustrates an isometric front view of a pressure relief housing 20 according to an embodiment of the present invention. The pressure relief housing 20 includes a plurality of air passage chambers 22, each of which includes lateral walls 24 integrally connected to top and bottom walls 26 and 28, respectively. The air passage chambers 22 are shown having a rectangular shape, but may be shaped in various other forms. An air passage wall 30 extends between the lateral, top and bottom walls 24, 26 and 28, respectively. The air passage wall 30 may include a plurality of openings 32 that are configured to allow air to pass therethrough. As shown in FIG. 2, the air passage wall 30 angles upwardly from the top wall 26 to the bottom wall 28. The angle of the air passage wall 30 may vary based on a desired amount of flap resistive force.

The housing 20 may be formed of a plastic, such as acrylic. The housing 20 may be formed through a thermoforming process, which is generally an efficient and economical way of making various plastic devices. During the manufacturing process, a roll of plastic is fed into a cavity, and then the plastic is formed using heat and pressure.

Instead of a plurality of air passage chambers 22, the housing 20 may include a single air passage chamber 22, which may include more or less openings 32 than those shown. Also, optionally, the air passage wall 30 may be coplanar with a flat underside of the housing 20, instead of being angled.

FIG. 3 illustrates an isometric front view of a flapper 34, according to an embodiment of the present invention. The flapper 34 includes a rigid support beam 36 having a recessed edge 38. A connecting stud 40 upwardly angles from a central location of the support beam 36. Gaps 42 in the recessed edge 38 are formed on either side of the stud 40.

The stud 40 includes a cross beam 44 connected to a generally perpendicular beam 46 that extends from the support beam 36 at an angle with respect to the plane of the support beam 36. Optionally, the stud 40 may be separated from the support beam 36 by gaps or channels. A stabilizing arm 48 extends from a base 50 of the beam 46, proximate the union of the support beam 36 and the beam 46, and may be generally coplanar and/or parallel with the support beam 36. As shown in FIG. 3, the stud 40 generally forms a "T" shape. However, instead of the cross beam 44, the stud may include a mating structure having various other shapes, such as circular, spherical, triangular, D-shaped, or the like.

Additionally, the stud 40 and stabilizing beam 48 may be positioned off center. That is, instead of being aligned along a central axis (vertical axis, as shown in FIG. 3) of the flapper 34, the stud 40 and beam 48 may be located at various other locations on the flapper 34.

A resilient, flexible membrane flap 52 that is configured to cover an air passage wall 30, shown in FIG. 2, extends from the support beam 36 and the stabilizing arm 48. The membrane flap 52 may be formed of a flexible thermoplastic elastomer, such as polypropylene, Hytrel, Lexan, Tyvac or Mylar. As shown in FIG. 3, the membrane flap 52 includes a proximal edge 54 that is secured to, or within, the support beam 36. The stabilizing arm 48 is positioned over and extends toward the center of the membrane flap 52. The stabilizing arm 48 may merely seat over the center of the membrane flap 52, or it may be bonded to a portion of the membrane flap 52. Optionally, the stabilizing arm 48 may include a longitudinal slot into which the membrane flap 52 is positioned. Lateral edges 58 and the distal edge 60 of the membrane flap 36 are free (that is, not secured to the support beam 36 of the stabilizing arm 48).

Figure 4:
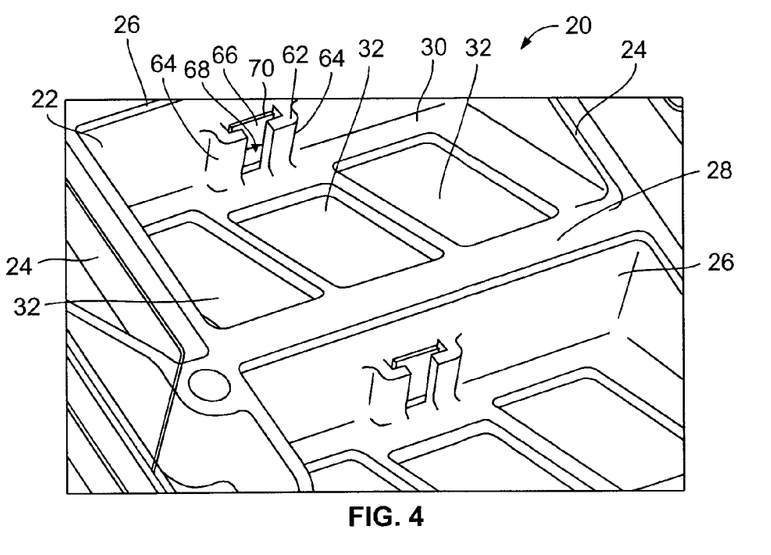
FIG. 4 illustrates an isometric front view of air passage chambers of a pressure relief housing, according to an embodiment of the present invention.

FIG. 4 illustrates an isometric front view of the air passage chambers 22 of the pressure relief housing 20. As shown in FIG. 4, the air passage wall 30 upwardly angles or inclines from a lower portion of the top wall 26 to an upper portion of the bottom wall 28.

A stud retainer 62 is positioned at a union of the top wall 26 and the air passage wall 30 and is generally located along a central vertical axis of the top wall 26, depending on whether the stud 40 of the flapper 34 is located along a central axis of the flapper 34. That is, if the stud 40 and stabilizing arm 48 are located at other positions on the flapper 34, the stud retainer 62 will be oriented in a similar fashion. The stud retainer 62 includes opposed bent retaining walls 64 separated by a vertical slot 66, thereby forming a stud retaining chamber 68 therebetween. A protruding pad 70 extends from the top wall 26 within the retaining chamber 68. Instead of a protruding pad, another protuberance, such as a bump, rib or the like may extend from the top wall.

Figure 5:
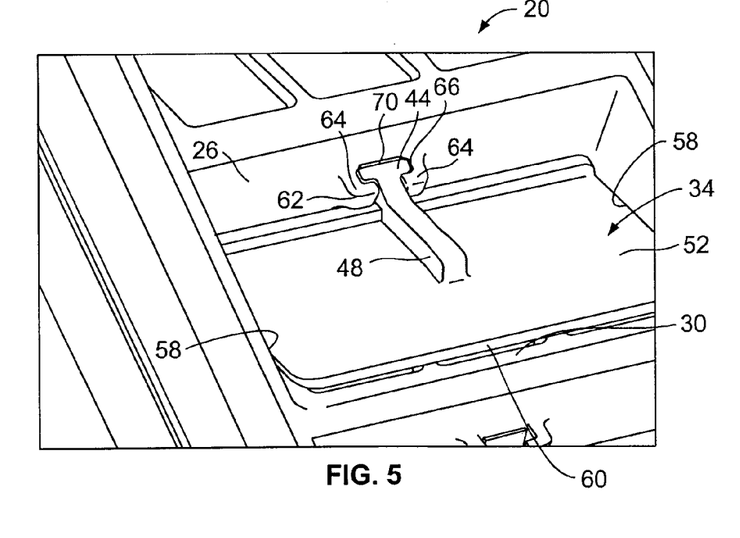
FIG. 5 illustrates an isometric front view of a flapper securely covering an air passage wall of a pressure relief housing, thereby forming a pressure relief assembly, according to an embodiment of the present invention.

FIG. 5 illustrates an isometric front view of the flapper 34 securely covering the air passage wall 30 of the pressure relief housing 20, thereby forming a pressure relief assembly, according to an embodiment of the present invention. The recessed edge 38 (shown in FIG. 2) abuts a lower edge of the top wall 26. The gaps 42 (shown in FIG. 3) on either side of the stud 40 allow the stud 40 to pass into the stud retaining chamber 68 (shown in FIG. 4). When the stud 40 is in the stud retaining chamber 68, the protruding pad 70 compresses the cross beam 44 into interior surfaces of the bent retaining walls 64. As such, the cross beam 44 is compressively sandwiched between the protruding pad 70 and the bent retaining wall 64. While in the stud retaining chamber 68, the stud 40 adjusts, such as by flexing, expanding, contracting or the like, to fill the remaining space therein. In this position, in which the recessed edge 38 abuts a lower edge of the top wall 26 and the stud 40 is secured within the stud retaining chamber 68, the flapper 34 is securely wedged in position over the air passage wall 30.

In general, the stud 40 may be secured within the stud retaining chamber 68 such that there is no appreciable floating of the stabilizing arm 48. This secure engagement of the stud 40 within the chamber 68 enhances proper operation of the pressure relief assembly and minimizes undesired flapping.

The membrane flap 52 is configured to resist air pressure up to a certain point. That is, the membrane flap 52 may be configured to remain fully seated over the air passage wall 30 until a certain amount of air pressure is exerted into the membrane flap 52. Thus, when air is released through the air passage wall 30, the outer free edges of the flexible membrane flap 52 open in order to allow the air to pass. After the air has passed, thereby relieving air pressure, the outer free edges of the flexible membrane flap 52 flex, snap or spring back over the air passage walls 30 in order to prevent moisture or other debris from passing therethrough.

When the membrane flap 52 opens, the stabilizing arm 48 prevents the membrane flap 52 from flapping all the way back toward the top wall 26. That is, the stabilizing arm 48 secures the center of the membrane flap 52 in place. As such, the lateral edges 58 and the distal edge 60 are forced upward about the stabilizing arm 48, thereby opening in a generally parabolic shape.

Referring to FIGS. 2-5, the stud 40 is angled or inclined with respect to the flap membrane 52 and the air passage wall 30. That is, while in the stud retaining chamber 68, the stud 40 is generally parallel with the top wall 26 while the stabilizing arm 48 is aligned with the flap membrane 52 and the air passage wall 30. As noted above, the air passage wall 30 slopes upwardly from the lower portion of the top wall 26 to an upper portion of the bottom wall 28. Thus, simply pulling on the flap membrane 52 will not enable disassembly of the flapper 34 from the air passage chamber 22. A certain amount of manipulation of the stabilizing arm 48 in relation to the air passage chamber 22 is used to remove the flapper 34. The offset or angled nature of the connecting stud 40 with respect to the stabilizing arm 48 assists in positioning the membrane flap 52 in such a manner so as to compress the membrane flap 52 into the air passage wall 30 with a certain amount of force or pressure. It has been found that this configuration tends to cause the outer edges of the membrane flap 52 to be forced against the outer edges of the air passage wall 30, when the membrane flap 52 is in the fully seated position. As such, undesirable flapping is minimized.

Figure 6:
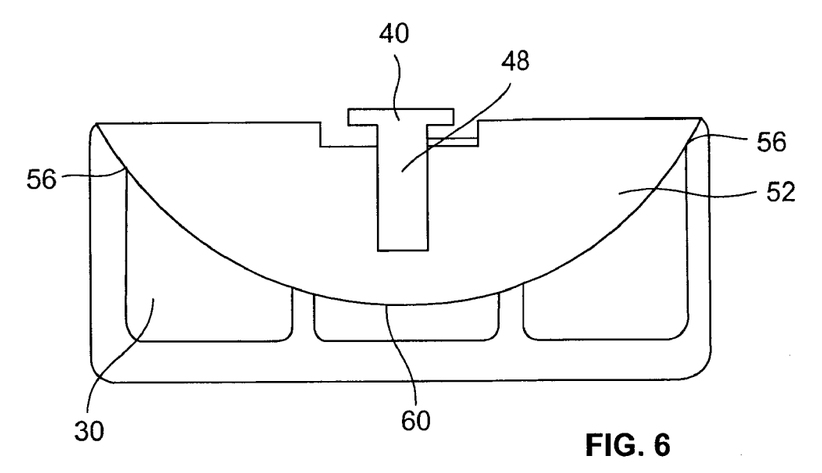
FIG. 6 illustrates a simplified front view of a membrane flap opening over an air passage wall, according to an embodiment of the present invention.

FIG. 6 illustrates a simplified front view of the membrane flap 52 opening over the air passage wall 30, according to an embodiment of the present invention. The stabilizing arm 48 anchors the center of the membrane flap 52 in position, while the portions of the membrane flap 52 distally located from the stabilizing arm 48 are forced upward more so than the portions of the membrane flap 52 closer to the stabilizing arm 48. Thus, in the full opened position, the lateral edges 56 and the distal edge 60 resemble a parabola. It has been found that the parabolic opening motion of the membrane flap 52 minimizes undesirable flapping noises, such as those produced by devices that are allowed to fully flap open. As air flow decreases, the flap membranes 52 return to their seated positions over the air passage wall 30.

Figure 7:
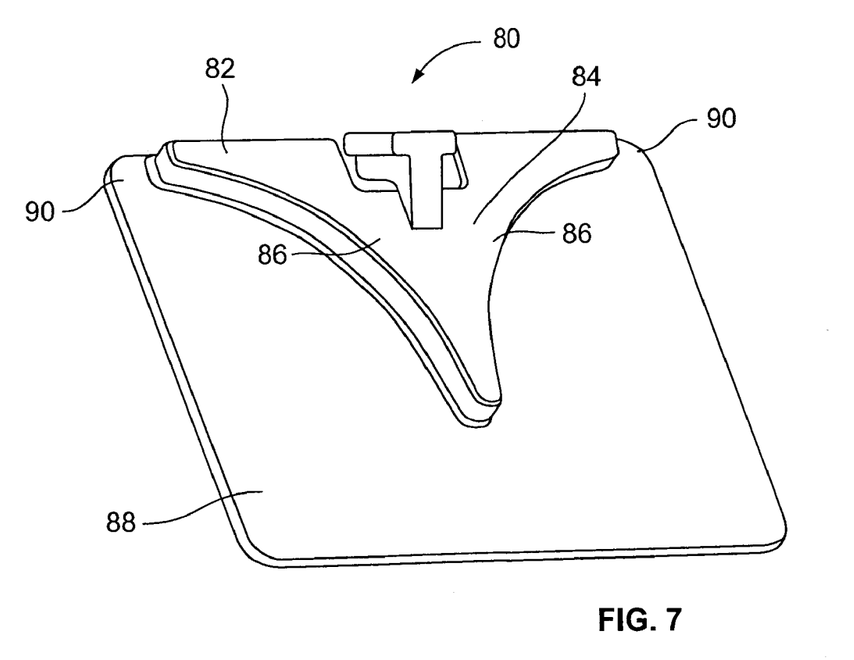
FIG. 7 illustrates an isometric front view of a flapper, according to an embodiment of the present invention.

FIG. 7 illustrates an isometric front view of a flapper 80, according to an embodiment of the present invention. The flapper 80 is similar to the flapper 34, shown in FIG. 3, for example, except instead of a straight stabilizing arm extending from the support beam 82, the flapper 80 includes a stabilizing triangular body 84 having two inwardly curved sides 86 connected to the base 82. The inward curve of the sides 86 allows greater degrees of edge movement than if the sides were straight. Also, the base 82 does not extend over the entire horizontal length of the edge of the membrane flap 88. As such, free ends 90 of the proximal edge of the membrane flap 88 may move up with increased air flow. However, the stabilizing triangular body 84 stabilizes a larger portion of the membrane flap 88, thereby limiting upward motion of the membrane flap 88. As such, the parabolic upward motion of the membrane flap 88 is less than that of the membrane flap 52 (shown, for example, in FIG. 6). This configuration may be used when a smaller air flap opening is desired.

Figure 8:
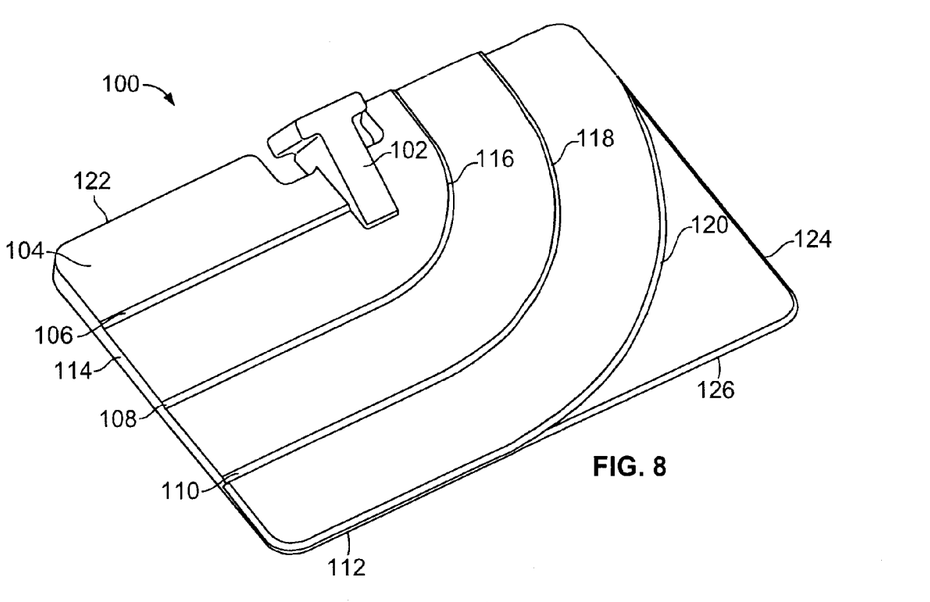
FIG. 8 illustrates an isometric front view of a flapper, according to an embodiment of the present invention.

FIG. 8 illustrates an isometric front view of a flapper 100, according to an embodiment of the present invention. The flapper 100 includes a shortened stabilizing arm 102 and a membrane flap 104 including a plurality of stiffening ribs 106, 108, 110 and 112. The ribs 106, 108, 110 and 112 extend horizontally from a first lateral edge 114. The rib 106 terminates at the stabilizing arm 102. The remaining ribs 108, 110, 112 include curved portions 116, 118 and 120, respectively that curve toward the proximal edge 122 of the membrane flap 104. As shown, the membrane flap 104 includes a series of levels or plateaus of varying thickness. The thickest level is a plateau defined between the rib 106, the lateral edge 114, the proximal edge 122 and the stabilizing arm 102. The second thickest level is between the ribs 106 and 108. The third thickest level is between the ribs 108 and 110, while a reduced thickness exists between the ribs 110 and 112. The thinnest portion of the membrane flap 104 is defined between the lateral edge 124, the distal edge 126 and the curved portion 120 of the rib 112. The varying degrees of thickness provide a membrane flap 104 having areas of varying flexibility. The thicker the portion of the membrane flap 104, the less flexibility it has. Membrane flaps of varying plateau thicknesses may be used depending on the desired flexibility of the a particular application.

Figure 9:
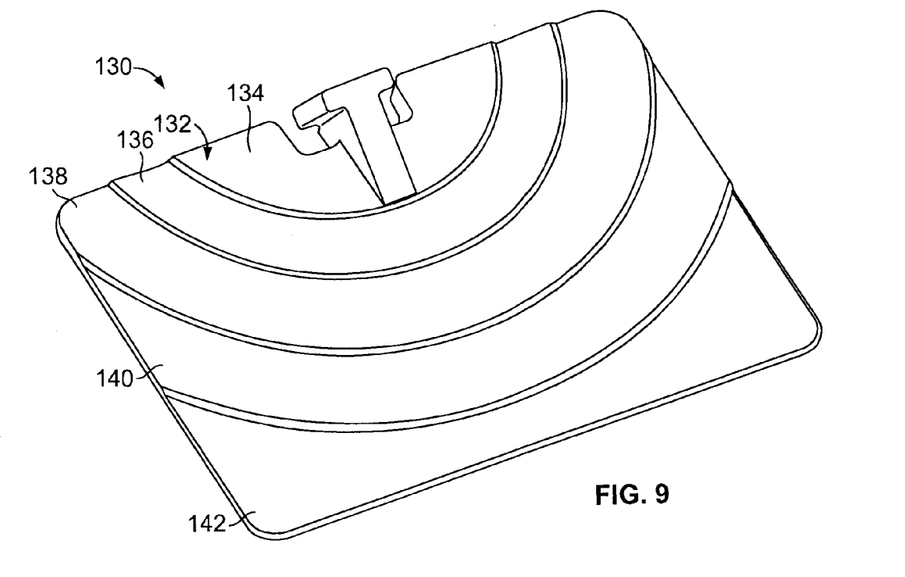
FIG. 9 illustrates an isometric front view of a flapper, according to an embodiment of the present invention.

FIG. 9 illustrates an isometric front view of a flapper 130, according to an embodiment of the present invention. The flapper 130 includes membrane flap 132 a series of plateaus 134, 136, 138, 140 and 142 of varying thickness. The proximally located plateau 134 is the thickest, thereby providing the least amount of flexibility, while the distally located plateau 142 is the thinnest, thereby providing the greatest amount of flexibility. Unlike the flapper 100, the plateaus are generally symmetrical.

In general, ribs and thickened plateaus of the membrane flap reduce undesirable flapping noise. For example, the ribs strengthen the membrane flap, thereby resisting flapping motion. Further, the thickened plateaus resist flapping motion directly proportional to their thicknesses.

The stud and stabilizing arms shown in FIGS. 7-9 may be positioned at various other locations on the respectively flappers, other than along a central vertical (as shown in the Figures) axis.

Figure 10:
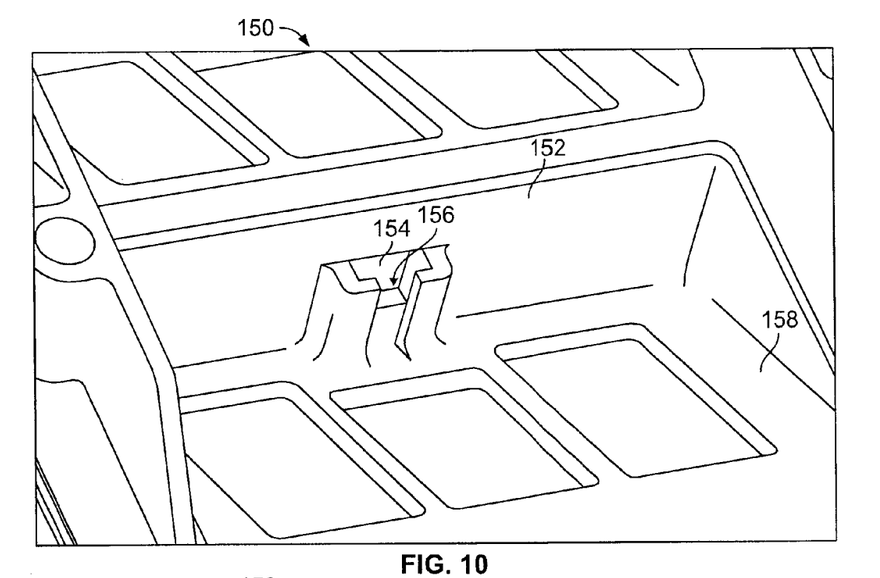
FIG. 10 illustrates an isometric front view of a pressure relief housing, according to an embodiment of the present invention.
Figure 11:
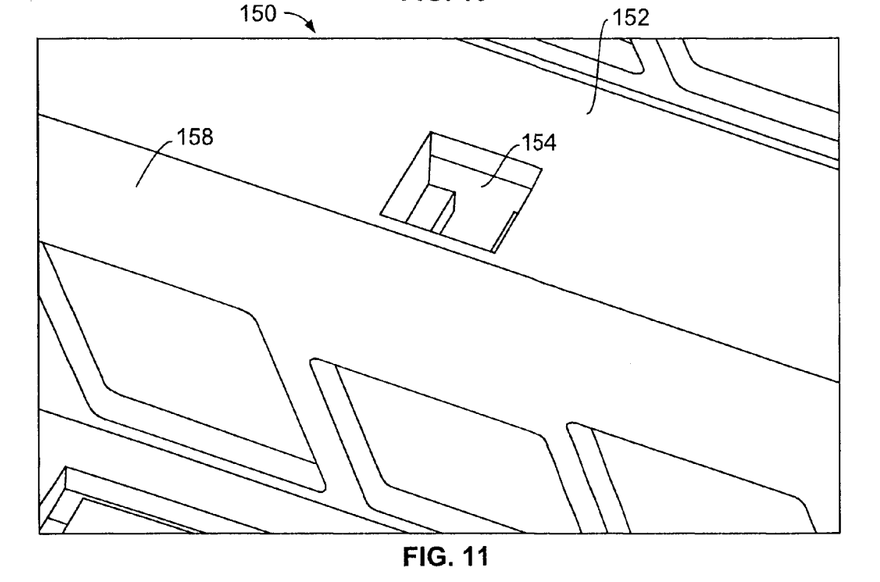
FIG. 11 illustrates an isometric back view of a pressure relief housing, according to an embodiment of the present invention.

FIGS. 10 and 11 illustrate isometric front and back views, respectively, of a pressure relief housing 150, according to an embodiment of the present invention. Referring to FIGS. 10 and 11, instead of a protruding pad extending from the top wall 152, a hole 154 is formed through the top wall 152 within the stud retaining slot 156. The hole 154 is configured to snapably, latchably, or otherwise securely retain a reciprocal member of the connecting stud, in order to secure a flapper over the air passage wall 158. The reciprocal member of the connecting stud, and/or the stud itself, is sized to fill and seal the hole 154.

Figure 12:
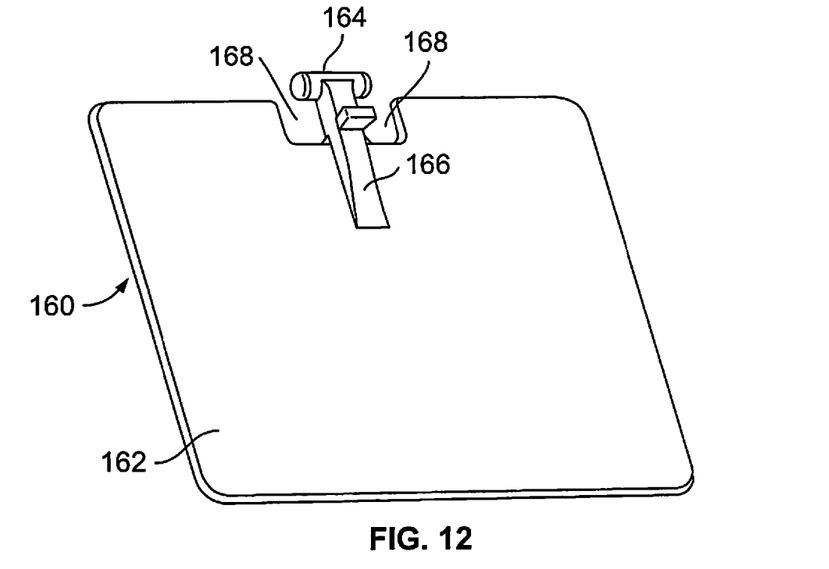
FIG. 12 illustrates an isometric front view of a flapper, according to an embodiment of the present invention.

FIG. 12 illustrates an isometric front view of a flapper 160, according to an embodiment of the present invention. The flapper 160 may be similar to the flappers described above. The flapper 160 includes a membrane flap 162 connected to a pivot stud 164 through a stabilizing arm 166. Clearance gaps 168 may be on either side of the pivot stud 164.

Figure 13:
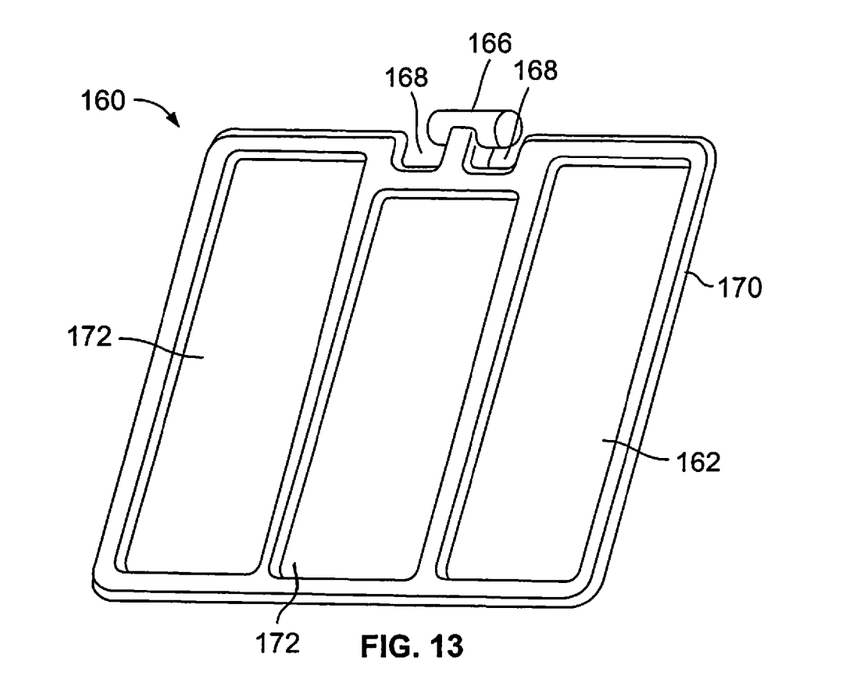
FIG. 13 illustrates an isometric rear view of a flapper, according to an embodiment of the present invention.

FIG. 13 illustrates an isometric rear view of the flapper 160. The membrane 162 may include sealing rims 170 and cored-out portions 172 defined between the sealing rims 170. The cored-out portions reduce the weight of the flapper 160, thereby proving increased response to airflow. The sealing rims 170 are configured to sealingly engage wall portions of a pressure relief housing.

Figure 14:
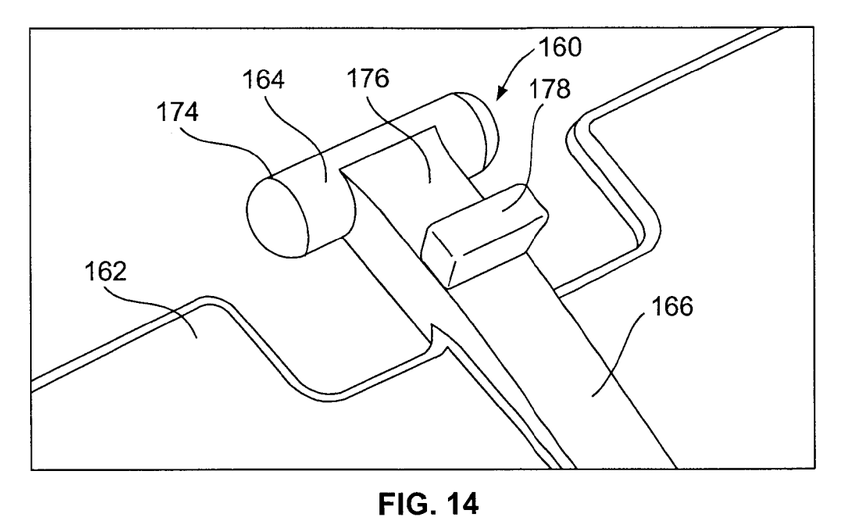
FIG. 14 illustrates an isometric front view of a pivot stud of a flapper, according to an embodiment of the present invention.

FIG. 14 illustrates an isometric front view of the pivot stud 164 of the flapper 160. The pivot stud 164 includes a cylindrical rod 174 perpendicularly connected to a beam 176, which in turn connects to the stabilizing arm 166. The cylindrical rod 174 is configured to pivot within a stud retaining chamber. As shown in FIG. 14, a stop block 178 upwardly extends from the beam 176. The stop block 178 is configured to limit the movement of the flapper 160 within a pressure relief housing. That is, the stop block 178 is configured to abut into a wall of the pressure relief housing upon a maximum upward pivot of the pivot stud 164, thereby preventing further upward pivotal movement.

Figure 15:
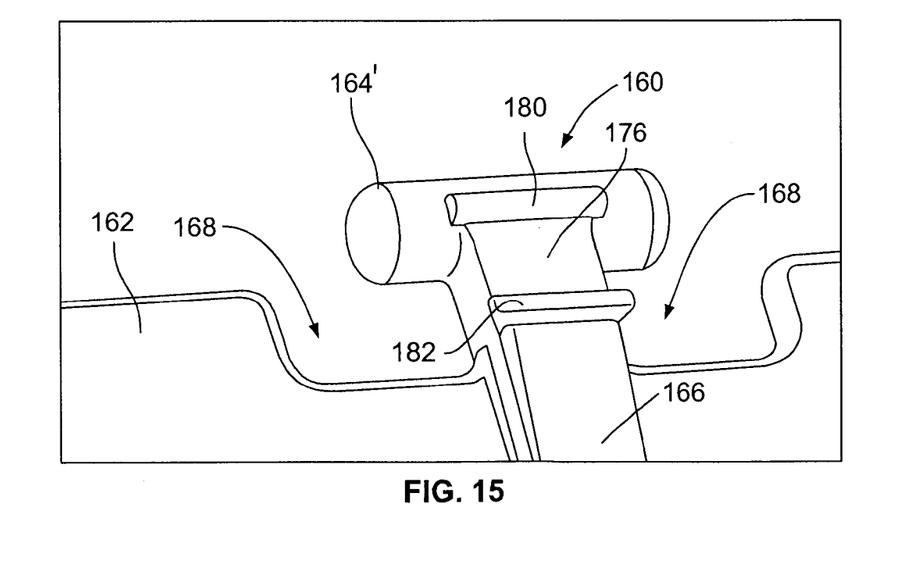
FIG. 15 illustrates an isometric front view of a pivot stud having a stop rod upwardly extending from a cylindrical rod and a stop beam extending upwardly from a beam, according to an embodiment of the present invention.

FIG. 15 illustrates an isometric front view of the pivot stud 164' having a stop rod 180 upwardly extending from the cylindrical rod 174 and a stop beam 182 extending upwardly from the beam 176, according to an embodiment of the present invention. Instead of having one stop block 178, the pivot stud 164' includes the stop rod 180 spaced apart from the stop beam 182. The dual stop protuberances control upward pivoting of the flapper more effectively than just a single stop block. That is, the cylindrical stop rod 180 engages a wall of the pressure relief housing, but, because it is round, allows for continued pivoting, albeit at a slower pace than if there was no stop rod. Once the stop beam 182 abuts into the wall of the pressure relief housing, further upward pivotal movement is prevented.

Figure 16:
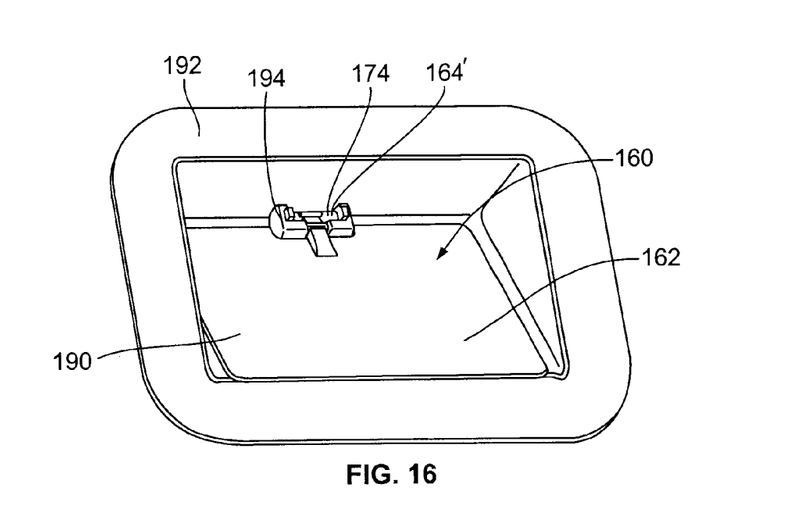
FIG. 16 illustrates a front isometric view of a flapper securely covering an air passage wall of a pressure relief housing, thereby forming a pressure relief assembly, according to an embodiment of the present invention.

FIG. 16 illustrates a front isometric view of the flapper 160 securely covering an air passage wall 190 of a pressure relief housing 192, thereby forming a pressure relief assembly, according to an embodiment of the present invention. The pivot stud 164 or 164' is pivotally secured within a stud retaining chamber 194. For example, the pivot stud 164 or 164' may snap into the stud retaining chamber 194, which then pivotally secures the pivot stud 164 or 164' in place.

Figure 17:
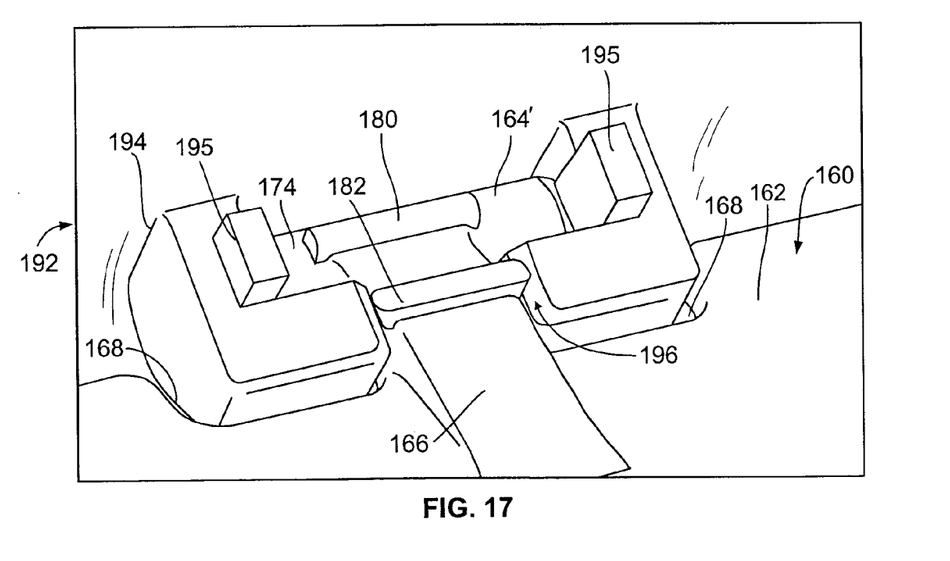
FIG. 17 illustrates a front isometric view of a pivot stud of a flapper pivotally secured within stud retaining chamber of a pressure relief housing, according to an embodiment of the present invention.

FIG. 17 illustrates a front isometric view of the pivot stud 164' of the flapper 160 pivotally secured within the stud retaining chamber 194 of a pressure relief housing 192, according to an embodiment of the present invention. The stabilizing arm 166 passes through an opening 196 formed in the stud retaining chamber 194. The ends of the walls of the stud retaining chamber 194 proximate the stabilizing arm 166 may be chamfered so that the walls do not snag the arm 166. The cylindrical pivot rod 164' is pivotally secured within the stud retaining chamber 194. Tabs 195 hang over the ends of the rod 174, thereby ensuring that the stud 164' or 164 remains within the stud retaining chamber 194.

In contrast to the flappers shown and described with respect to FIGS. 2-11, the pivot stud 164' or 164 pivots upwardly (as opposed to remaining fixed in place with only the membrane flap moving) with increased airflow. That is, referring to FIGS. 12-17, as air pressure is exerted into an underside of the membrane flap 162, the cylindrical rod 174 pivots upwardly with respect to the stud retaining chamber 164. As such, the stabilizing arm 166 may move upward, instead of just the membrane 162. A pivot tolerance may be tuned or adjusted to provide a desired amount of pivoting resistance. That is, the pivot stud 164 or 164' may pivot into a open position at a particular air pressure and pivot back down to a closed position when air pressure is below that particular pressure. The stop block 178 and/or the stop rod 180 and stop beam 182 control the range of upward pivot, as described above.

Figure 18:
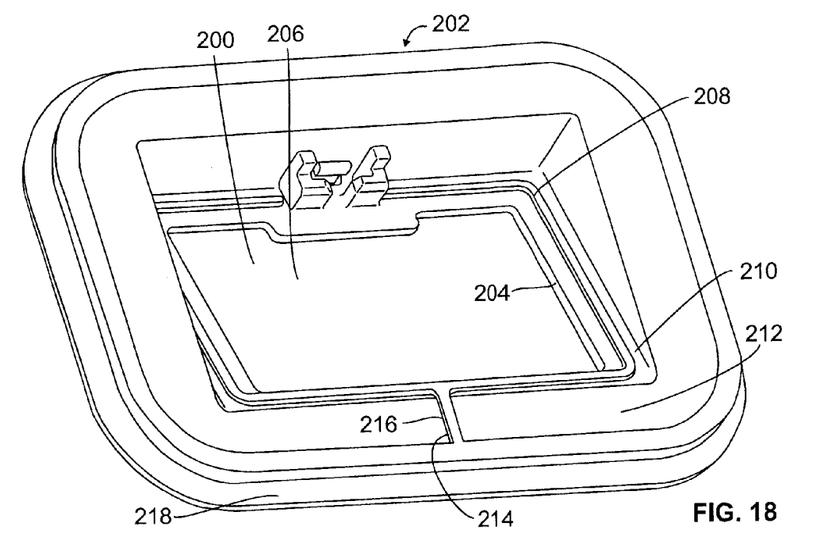
FIG. 18 illustrates an isometric front view of an air passage chamber of a pressure relief housing, according to an embodiment of the present invention.

FIG. 18 illustrates an isometric front view of an air passage chamber 200 of a pressure relief housing 202, according to an embodiment of the present invention. The air passage chamber 200 may be the same as any of those described above, with the addition of a flap seal 204 that surrounds an air opening 206 about an edge 208 of a flapper seat 210. The flap seal 204 may be formed of an elastomeric material, such as rubber, and provides a fluid tight barrier. The flap seal 204 may be molded onto the flapper seat 210.

A wall 212 of the pressure relief housing 202 may include a channel 214 that receives and retains a seal strap 216 that connects the inner flap seal 204 with an outer seal 218 that surrounds an outer perimeter of the pressure relief housing 202. More or less seal straps 216 may be used. For example, a seal strap may connect the flap seal 204 to the outer seal at areas over each of the four walls. Further, the seal strap 216 and the flap seal 204 may be connected to one another through a contiguous piece of elastomeric material that blankets over the walls of the housing 202. Thus, the inner flap seal 204 and the outer seal 218 may be formed as a single piece of elastomeric material that provides (i.) a sealing interface with an opening within a frame into which the pressure relief housing 202 is positioned and (ii.) a sealing interface between the flapper seat 210 and a flapper. Optionally, the inner flap seal 204 and the outer seal 218 may be formed as separate and distinct pieces that are not connected by the seal strap 216. Nevertheless, a unitary seal member, as shown in FIG. 18, allows for a quicker and more efficient molding and assembly process.

Figure 19:
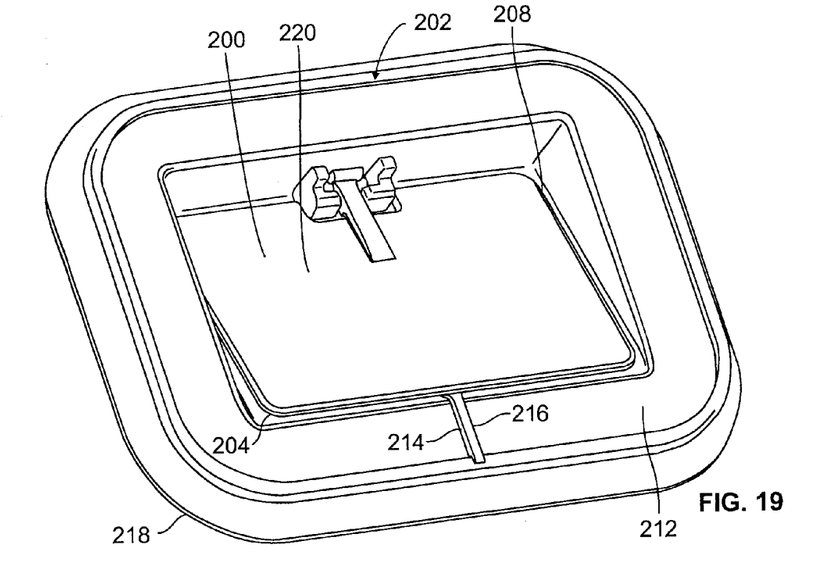
FIG. 19 illustrates an isometric front view of a flapper securely covering an air opening of a pressure relief housing, thereby forming a pressure relief assembly, according to an embodiment of the present invention.

FIG. 19 illustrates an isometric front view of a flapper 220 securely covering the air opening 206 (shown in FIG. 18) of the pressure relief housing 202, thereby forming a pressure relief assembly. In the closed position, the outer edges of the flapper 220 are seated over the flapper seat 210, such that they directly abut the inner flap seal 204, which provides a sealing interface therebetween.

The sealing members shown and described in FIGS. 18 and 19 may be used with any of the embodiments described above.

Embodiments of the present invention provide membrane flaps that are configured to lift off air passage walls at their edges, not as an entire body. As such, embodiments of the present invention reduce or minimize audible flapping noises.

Embodiments of the present invention provide a robust pressure relief assembly that may be tuned and adapted to meet airflow and sealing requirements for a particular user. Further, the embodiments described above may be manufactured through simple tooling. For example, a user merely positions the stud of the flapper into the stud chamber of the housing, thereby providing a quick and easy assembly process.

Further, embodiments of the present invention provide pressure relief assemblies of smaller depth, lighter weight and reduced size as compared to conventional designs. This is because embodiments of the present invention, unlike conventional designs, do not rely entirely on gravity to keep the flapper seated.

While various spatial terms, such as upper, lower, mid, lateral, horizontal, vertical, and the like may used to describe portions of the described embodiments, it is understood that such terms are merely used with respect to the orientations shown in the drawings. The orientations may be inverted, rotated, or otherwise changed, such that an upper portion is a lower portion, and vice versa, horizontal becomes vertical, and the like.

Variations and modifications of the foregoing are within the scope of embodiments of the present invention. It is understood that embodiments of the present invention disclosed and defined herein extend to all alternative combinations of two or more of the individual features mentioned or evident from the text and/or drawings. All of these different combinations constitute various alternative aspects of embodiments of the present invention. The embodiments described herein explain the best modes known for practicing the invention and will enable others skilled in the art to utilize the invention. The claims are to be construed to include alternative embodiments to the extent permitted by the prior art.

Various features of the invention are set forth in the following claims.

The invention claimed is:

1. A pressure relief assembly comprising:
a main housing having an air passage chamber; and
a flapper positioned within said air passage chamber, said flapper comprising a membrane flap and a stabilizing member extending toward a center of said membrane flap, said stabilizing member preventing said center of said membrane flap from flapping open, and said stabilizing member allowing outer free edges of said membrane flap to open when air flow at a particular pressure is exerted into said membrane flap from an opening direction.

2. The pressure relief assembly of claim 1, wherein said flapper comprises a base connected to said stabilizing member, said stabilizing member comprising a straight beam perpendicularly extending from said base.

3. The pressure relief assembly of claim 1, wherein said stabilizing member comprises a triangular main body having at least two curved sides.

4. The pressure relief assembly of claim 1, wherein said air passage chamber is defined by lateral, top and bottom walls with an air passage wall extending therebetween, wherein said air passage wall angles from a lower portion of said top wall to an upper portion of said bottom wall.

5. The pressure relief assembly of claim 1, wherein said main housing comprises a stud retainer and said flapper comprises a stud, wherein said stud is retained within said stud retaining retainer.

6. The pressure relief assembly of claim 5, wherein said stud is angled with respect to said stabilizing member.

7. The pressure relief assembly of claim 5, wherein said stud retainer comprises a protuberance that exerts a force into said stud within said stud retainer slot.

8. The pressure relief assembly of claim 5, wherein said stud retainer comprises a hole formed therethrough, said stud being configured to latchably and sealably secure within said hole.

9. The pressure relief assembly of claim 1, wherein said membrane flap comprises a plurality of strengthening ribs.

10. The pressure relief assembly of claim 1, wherein said membrane flap comprises areas of varying thickness.

11. The pressure relief assembly of claim 1, wherein outer free edges of said membrane flap open to form a parabola when air that exceeds a particular pressure is exerted into said membrane flap from the opening direction.

12. The pressure relief assembly of claim 1, comprising a flap seal formed of an elastomeric material secured to said main housing and sealingly engaging outer edges of said membrane flap when said membrane flap is in a closed position.

13. The pressure relief assembly of claim 12, comprising an outer seal secured around an outer perimeter of said main housing.

14. The pressure relief assembly of claim 13, wherein said outer seal is integrally connected to said flap seal.

15. A pressure relief assembly comprising:
- a main housing having an air passage chamber and a stud retainer having a stud retaining slot within said air passage chamber, said air passage chamber defined by first, second, third and fourth outer walls with an air passage wall extending therebetween, said air passage wall being inclined within said air passage chamber; and
- a flapper positioned within said air passage chamber, said flapper comprising a base connected to a stabilizing member and a membrane flap extending from said base, wherein a stud is connected to an end of said stabilizing member, said stud being retained within said stud retaining slot, said stabilizing member extending over a portion of said membrane flap toward a center of said membrane flap, said stabilizing member preventing said center of said membrane flap from flapping open, and said stabilizing member allowing outer free edges of said membrane flap to open when air flow at a particular pressure is exerted into said membrane flap from an opening direction, wherein movement of said outer free edges increases the farther away from said stabilizing member.

16. The pressure relief assembly of claim 15, wherein said flapper comprises a base connected to said stabilizing member, said stabilizing member comprising a straight beam perpendicularly extending from said base.

17. The pressure relief assembly of claim 15, wherein said stabilizing member comprises a triangular main body having at least two curved sides.

18. The pressure relief assembly of claim 15, wherein said stud is angled with respect to said stabilizing member.

19. The pressure relief assembly of claim 15, wherein said stud retainer comprises a protuberance that exerts a force into said stud within said stud retainer slot.

20. The pressure relief assembly of claim 15, wherein said stud retainer comprises a hole formed therethrough, said stud being configured to latchably and sealably secure within said hole.

21. The pressure relief assembly of claim 15, wherein said membrane flap comprises a plurality of strengthening ribs.

22. The pressure relief assembly of claim 15, wherein said membrane flap comprises areas of varying thickness.

23. The pressure relief assembly of claim 15, wherein outer free edges of said membrane flap open to form a parabola when air that exceeds a particular pressure is exerted into said membrane flap from the opening direction.

24. The pressure relief assembly of claim 15, comprising a flap seal formed of an elastomeric material secured to said main housing and sealingnly engaging outer edges of said membrane flap when said membrane flap is in a closed position.

25. The pressure relief assembly of claim 24, comprising an outer seal secured around an outer perimeter of said main housing.

26. The pressure relief assembly of claim 25, wherein said outer seal is integrally connected to said flap seal.

27. A pressure relief assembly comprising:
- a main housing having an air passage chamber and a stud retainer, said air passage chamber defined by first, second, third and fourth outer walls with an air passage wall extending therebetween, wherein said air passage wall is inclined within said air passage chamber;
- a flapper positioned within said air passage chamber, said flapper comprising a base connected to a stabilizing member and a membrane flap extending from said base, said membrane flap comprises a plurality of strengthening ribs and areas of varying thickness, wherein a stud is connected to an end of said stabilizing member, said stud being angled with respect to said stabilizing member, said stud being retained within said stud retainer, said stabilizing member extending over a portion of said membrane flap toward a center of said membrane flap, said stabilizing member allowing edges of said membrane flap to open when air flow at a particular pressure is exerted into said membrane flap from an opening direction, and wherein outer free edges of said membrane flap open to form a parabola when air that exceeds a particular pressure is exerted into said membrane flap from the opening direction;
- a flap seal formed of an elastomeric material secured to said main housing and sealingnly engaging outer edges of said membrane flap when said membrane flap is in a closed position; and
- an outer seal secured around an outer perimeter of said main housing, wherein said outer seal is integrally formed with said flap seal.

28. The pressure relief assembly of claim 27, wherein said outer seal is integrally connected to said flap seal.

29. The pressure relief assembly of claim 28, wherein said stud comprises a pivot rod, said pivot rod being pivotally secured within said stud retainer, said pivot rod being configured to pivot in said stud retainer causing said stabilizing member to pivot in response thereto.

30. The pressure relief assembly of claim 29, wherein said stud comprises at least one stop member configured to limit a range of pivotal motion.

\* \* \* \* \*